United States Patent [19]
Schulz et al.

[11] 3,859,003
[45] Jan. 7, 1975

[54] PRECISION HEAD FOR A MACHINE TOOL

[76] Inventors: George W. Schulz, 1665 Moulin, Madison Heights, Mich. 48071; Werner C. Schulz, 19744 Littlefield, Detroit, Mich. 48235

[22] Filed: Nov. 23, 1973

[21] Appl. No.: 418,579

[52] U.S. Cl.............. 408/234 R, 90/96, 308/3 A, 308/6 R
[51] Int. Cl............................................. F16c 23/06
[58] Field of Search................ 308/3 A, 6 R; 90/96; 408/234 R

[56] References Cited
UNITED STATES PATENTS

| | | | |
|---|---|---|---|
| 206,648 | 7/1878 | Tucker................................ | 308/6 R |
| 1,846,019 | 2/1932 | Bangser............................ | 308/6 R X |
| 3,469,058 | 9/1969 | O'Connor........................ | 308/6 R X |

*Primary Examiner*—Gil Weidenfeld
*Attorney, Agent, or Firm*—Hauke, Gifford, Patalidis & Dumont

[57] ABSTRACT

The head includes an outer stationary ram support which is fixed to the machine tool column and an inner vertically movable ram. The motive means, such as a hydraulic motor, has its cylinder substantially centered with respect to the ram. An improved raceway construction includes a pair of opposed V-shaped cross-sectional raceways mounted at opposed sides of the ram and the ram support. The raceways contain a plurality of vertically spaced ball bearings to provide free sliding movement of the ram. An improved means for locking the opposed raceways into accurate position, one relative to the other, comprises an adjusting screw for initially biasing one of the outer V-shaped raceways toward the opposed fixed raceway and a locking screw suitably aligned and tightened to lock the head of the adjusting screw against the associated raceway outer surface, holding it against displacement.

5 Claims, 5 Drawing Figures

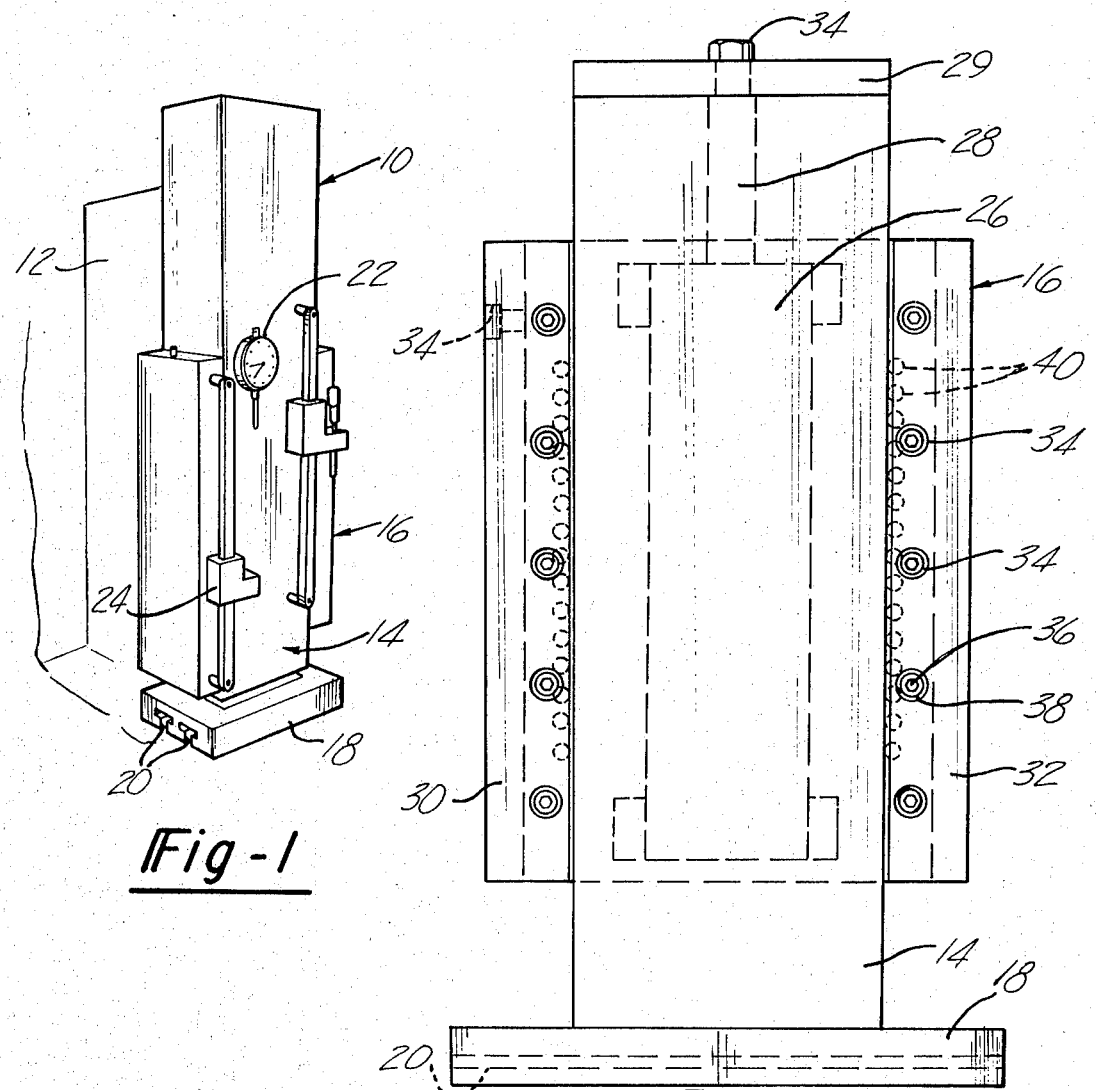
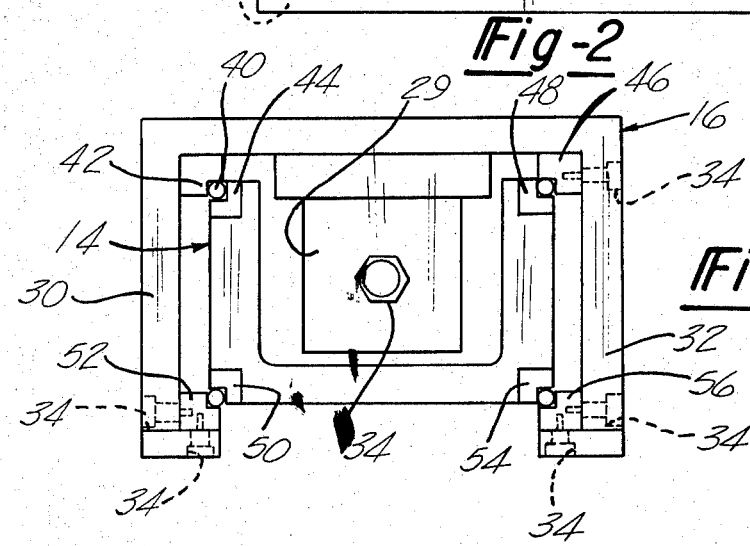

PRECISION HEAD FOR A MACHINE TOOL

BACKGROUND OF THE INVENTION

I. Field of the Invention

The invention relates to precision machine tools, for example those used in electrical discharge machining or in electrochemical machining. More specifically, the invention is concerned with the precision head used on the machine tool with particular attention to an improved raceway construction of the ball bearing type which provides exceedingly accurate vertical movement of the ram with its attached electrode tool. The head is locked solidly to the column through the ram support and the force of the motive means raising and lowering the ram is applied substantially on-center relative to the ram so that there is little or no deflection of the ram about its vertical axis or away from the machine column.

II. Description of the Prior Art

Prior art machine tools for electrical discharge machining, electrochemical machining or like operations have generally included included ram structures with dovetail or roller slide assemblies, most often located far rearwardly of the ram itself. One example of the prior art is shown in O'Connor U.S. Pat. No. 3,612,810, which serves to illustrate problems existing in such structures with poor distribution of weight relative to the ram and with the actual movement of the head being provided by a motive means through a force applied at a point well spaced from the center of the ram. This causes excessive deflection and run-out, particularly when the cavity which is being sunk is relatively deep.

SUMMARY OF THE INVENTION

In accordance with the present invention, there is provided a precision head for use in conjunction with machining operations, such as electrical discharge machining or electrochemical machining, in which the ram is movable relatively to the ram support in a vertical direction, with the ram support being rigidly attached to the column of the machine tool. Free sliding movement is insured by the use of opposed pairs of V-shaped cross-sectional raceways and ball bearings mounted therein. The opposed pairs of raceways and the center of the ram itself are all substantially equidistant from the center of the hydraulic motor piston used to raise and lower the ram. This insures that the deflection about the vertical action is minimized.

In the preferred embodiment, the array of ball bearings is substantially equal in length to the maximum vertical stroke such that the contact between the opposed V-shaped raceways and balls is kept substantially the same, even as the array is being moved downwardly in the lower direction. A second feature, which will become apparent from the preferred embodiments, includes an improved locking system by which the opposed raceways are first aligned, prebiased and finally locked into position. To provide this mode of operation, there is included a precision ground adjusting screw which is first tightened in order to bias the movable one of the V-shaped raceways toward the other. In the final locking step, a locking nut threadably connected through the adjusting screw and into the opposed fixed raceway is tightened to hold the adjusting screw into tight abutment with the surface of the movable raceway. A still further feature of the invention is that embodiment which is adapted to provide particularly heavy weight bearing capability and again insure free vertical movement without allowing deflection of the ram. In this particular embodiment, there are provided an opposed two pair of V-shaped raceways at the front and at the rear portion of the ram. The frontwardly located pairs of raceways are tightened into place by oppositely directed adjusting and locking screw combinations. A second orthogonally directed adjusting screw and locking screw combination is also included with respect to each of the front two raceway pairs so that in each case forces are applied with a resultant of substantially 45° to compensate for any slight dimensional inaccuracies which might be present in the two opposing raceways.

BRIEF DESCRIPTION OF THE DRAWINGS

FIG. 1 is a general perspective view of the precision head and platen showing the manner in which it is typically attached to a machine column;

FIG. 2 is a front elevational view illustrating the general arrangement of the locking screw combinations, the raceways and the array of ball bearings;

FIG. 3 is a top view of the precision head further illustrating the construction of the raceways and the multiple locking combinations;

DESCRIPTION OF THE PREFERRED EMBODIMENT

Figure 4:
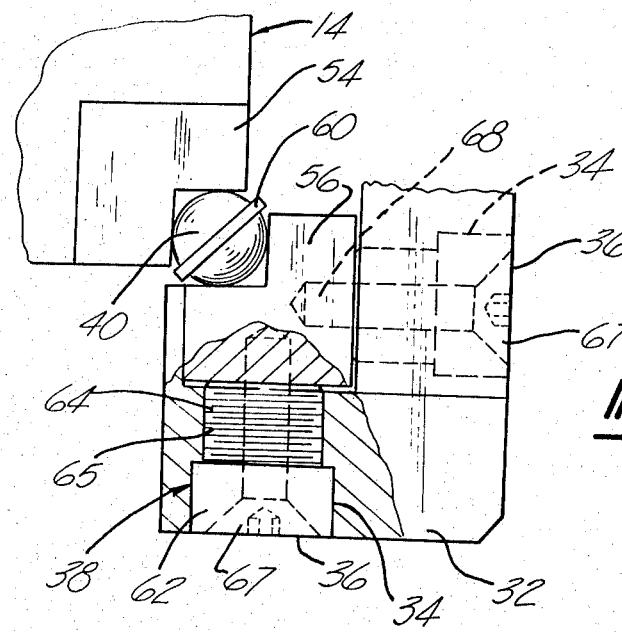
FIG. 4 is a view of a portion of the FIG. 3 drawing drawn to enlarged scale with parts broken away to illustrate the manner of construction of the locking combinations.

The precision head 10 is illustrated in FIG. 1 as it is attached to a machine tool vertical column 12. Included in the structure of the head 10 are the vertically movable ram portion 14 and the ram support 16, which is actually mounted on the machine column 12. The ram 14 includes at its lower end a platen 18. The platen 18 may include one or more electrode receiving slots 20 at its lower surface. It will be understood that the present invention is not limited in its application to machine tools for electrical discharge machining or electrochemical machining, but indeed may be applied to any machine tool in which there is required accurate and precise movement of a tool or workpiece carrying ram in a vertical direction. It is likewise adaptable to machine tools in which the ram is movable along an axis other than the vertical one. Also shown in the general view of FIG. 1 are the travel indicator 22 and the actuator 24 associated with the machine tool ram.

FIG. 2 shows the platen 18 attached to the lower part of the ram 14. Also shown is the motive means for driving the ram 14 upwardly or downwardly as the machining operation is being carried on. In the present instance, the motive means is embodied as a hydraulic cyliner 26 with associated piston rod 28. In accordance with the operation of an operably connected electromagnetic servo valve in the system in a manner well known in the art, the hydraulic cylinder 26 and rod 28 are used to apply upwardly and downwardly forces to raise and lower the ram 14. The ram support 16 includes a forwardly extending side portion 30 at its left side and a forwardly extending side portion 32 at its right side. The rod 28 is attached at its upper end to a plate 29 at the upper end of the rear side of the ram support 16 through a fastener bolt 34.

Also shown in FIG. 2 are the plurality of substantially equally spaced vertically aligned locking screw combinations 34, each such combination including a central locking screw 36 and an outer adjusting screw 38, as will be better shown in FIG. 4 hereinafter. Each pair of opposed raceways includes a plurality of ball bearings 40 spaced one from the other as shown and contained between the opposed raceways.

FIG. 3 shows in more detail the construction of the four opposed pairs of raceways. In the embodiment of FIG. 3 at the rear of the ram support 16, there is included at the left hand side an opposed fixed pair of V-shaped cross-sectional raceways comprising raceway 42 which is mounted on the ram support 16 and raceway 44 which is mounted at the upper left hand corner of the ram 14. At the right hand corner of the ram 14, there is a second opposed pair of raceways of which a movable raceway 46 is mounted on the ram support 16 and a fixed raceway 48 is mounted on the ram 14. One of the locking screw combinations 34 is shown in hidden line as it is used to maintain a leftwardly directed force against the raceway 46. At the lower left corner of the ram 14, there is shown a further opposed pair of raceways 50 and 52. With respect to the raceway 52 mounted on the side portion 30 of the ram support 16, it has extending into it a pair of locking screw combinations 34. At the lower right hand corner of the ram 14, there is included a final fourth pair of opposed raceways 54 and 56 mounted on the ram 14 and the ram support side portion 32, respectively. A second lineup of locking screw combinations 34 are further included as indicated in the drawing.

FIG. 4 is an enlarged view of the lower right hand portion of the FIG. 3 drawing showing the upper end and the detail of the raceways 54 and 56, and the associated locking screw combinations. A portion of the cage 60 for the uppermost ball bearing 40 is shown. It will be seen from the broken-away section that the adjusting screw 38 includes a head portion 62 and a threaded portion 64. Alternately, the head portion 62 may be incorporated as a separate lock washer. The threaded portion 64 is in engagement with a threaded opening 65 formed in the opposed side portion 32 of the ram support 16. The locking screw 36 used in each locking combination 34 includes a tapered head portion 67 and a threaded portion 68. In the assembly of each opposed pair of raceways, the sequence may be described as follows: each adjusting screw 38 is threaded into the matching threaded portion 65 formed in the ram support 16. This forces, with respect to FIG. 4, the outer raceway 56 mounted on the ram support 16 into engagement with the intermediate ball bearings 40 and prebiases it against the opposed fixed raceway 54. The locking screw 36 is then tightened in the preformed threaded portion in the raceway 56, locking the head 67 of the locking screw 36 into tight holding engagement with the head 62 of the adjusting screw 38, to positively hold it against displacement. In this manner, the opposed raceways are first prebiased one against the other and then tightened into solid holding engagement through the locking combination 34. It will be seen that the FIG. 3 and 4 embodiment further provides at the front corners of the ram 14 opposed lines of locking combinations 34 aligned such that the forces applied by each are orthogonal one to the other with the resultant force applied either to the raceway 52 or the raceway 56 along a 45° angle. This is to compensate for any possible misalignment in the event the two raceways are not exactly identical in size.

With respect to FIG. 3, the assembly sequence would be as follows: the upper right hand locking screw combination 34 would be tightened, forcing the right hand raceway 46 into alignment with the fixed raceway 48. Next, the lower left front locking combination 34 is tightened to move the raceway 52 rearwardly and lock it in. In the next step, the lower right front locking combination 34 is tightened so that the opposed pairs of raceways are locked against movement in either direction with respect to the ram support 16. Next, the side locking screw combination 34 in side portion 30 and the side locking screw combination 34 in side portion 32 are tightened and locked. In this embodiment, the resultant force is applied to the raceways 52 and 56 along the 45° line to automatically compensate for any minor misalignment through the tightening in two different directions.

Figure 5:
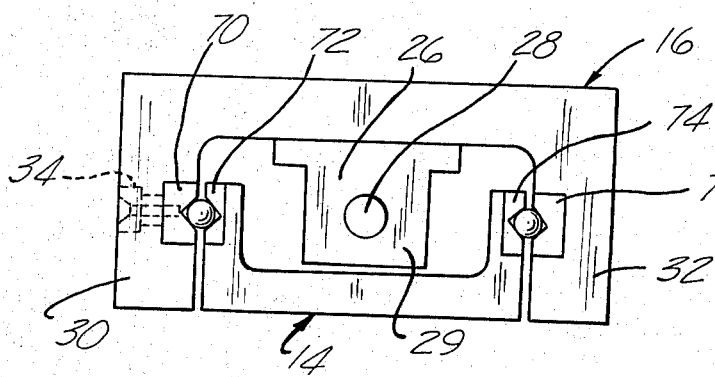
FIG. 5 is a top view of a different preferred embodiment of a precision head adaptable to be used with relatively light-weight electrodes.

FIG. 5 is a different embodiment adapted to handle somewhat lighter electrode tool loads on the ram 14. Accordingly, only two pairs of opposed raceways are required, as shown, with only one line of locking screw combinations 34 used to apply a force, as shown, from the left hand side, that is from the left hand side portion 30, of the ram support 16. Again, it will be seen that the motive means attached to the ram 14, such as the hydraulic cylinder 26 with rod 28, is substantially centered over the ram 14 and approximately in line with the two opposed pairs of raceways 70, 72 and 74, 76. In this way, again the force is centrally applied to move the ram 14 upwardly and downwardly, thus greatly minimizing any deflection about the vertical axis of the head.

It will thus be seen that the present invention affords a substantial advancement over the prior art with respect to a precision head and an improved structure for mounting ball bearing raceways between the ram and the ram support.

We claim:

1. A precision head for a machine tool comprising:
   an outer stationary ram support;
   an inner ram movable axially in said ram support;
   a pair of opposed inner and outer V-shaped cross-sectional raceways mounted at opposed sides of the ram and ram support, said raceways each containing a plurality of spaced ball bearings maintained therein to provide free sliding movement of the ram relative to the ram support;
   a means for locking the opposed raceways into accurate position comprising an adjusting screw extending through a threaded portion of the ram support for initially engaging and preloading one of the outer V-shaped raceways toward the ball bearings and the opposed inner raceway in prealigned relationship; and
   a lock screw threadably engaging the outer raceway, axially extending through the adjusting screw and having its head in abutment with the head of said adjusting screw for locking it to hold the raceways in said prealigned relationship; at least one additional means is included in said ram support for locking the opposed raceways, comprising a second adjusting screw extend-ing through a threaded portion of the ram support for initially preloading one of the outer V-shaped raceways toward the opposed inner raceway in prealigned relationship, and a second lock screw threadably engaging the outer raceway, axially extending through the adjusting screw and having its head in abutment with the head of said adjusting screw for locking it in said prealigned relationship, said second adjusting screw and lock screw having their axes oxiented transaxial to the axes of the first adjusting screw and lock screw.

2. A precision head for a machine tool mountable on the machine tool column comprising:

an outer stationary ram support fixed on the column in substantially vertical position;

an inner vertically movable ram;

a motive means mounted on said support and operably connected to said ram;

four pairs of opposed V-shaped cross-sectional raceways, two pairs located intermediate the rear corners of said ram and the ram support and the other two pairs located intermediate the forward corners of said ram and the ram support, said raceways being vertically oriented and each pair containing a plurality of vertically spaced ball bearings maintained therein to provide free sliding movement of the ram relative to the ram support;

a first locking combination for preloading and locking the opposed raceways into accurate vertically oriented position comprising a plurality of spaced adjusting screws extending through a threaded portion of the ram support into engagement with one of the outer raceways for initially preloading it toward the opposed inner raceway;

a lock screw extending through a central portion of the adjusting screw and threadably engaging an opening in said inner raceway; and a second locking combination extending through the outer ram support with its axis orthogonally aligned relative to the axis of first mentioned combination.

3. The combination as set forth in claim 2 wherein the distance of spacing between the ball bearings is sufficient to provide a ball bearing double-turn with respect to the overall length between the upper and lower limits of movement of the ram.

4. The combination as set forth in claim 2 wherein there is mounted at the lower end of said ram a platen, said platen having at least one T-shaped opening therethrough for mounting a cutting tool at the lower surface of the platen.

5. The combination as set forth in claim 2 wherein said motive means comprises a hydraulic motor, said hydraulic motor having its piston rod substantially centered with respect to the ram.

* * * * *